March 2, 1948.                     H. M. BACH                     2,437,218
                METHOD AND MEANS FOR MOUNTING PIEZO CRYSTAL PLATES
                             Filed Jan. 28, 1946

Inventor
HENRY M. BACH
By Herman L. Gordon
Attorney

Patented Mar. 2, 1948

2,437,218

UNITED STATES PATENT OFFICE 2,437,218

METHOD AND MEANS FOR MOUNTING PIEZO CRYSTAL PLATES

Henry M. Bach, Woodmere, N. Y., assignor to Premier Crystal Laboratories, Incorporated, New York, N. Y.

Application January 28, 1946, Serial No. 643,921

10 Claims. (Cl. 171—327)

This invention relates to piezo-electric crystal units, and more particularly to piezo-electric crystal units of the air gap type.

A main object of the invention is to provide a novel and improved method and means for mounting vibratory crystals, said method and means being such that the crystal is effectively maintained in desired position between its electrodes without being frictionally loaded to an undesired degree by its positioning means, whereby the vibrations of the crystal will be substantially undamped.

A further object of the invention is to provide an improved method and means for mounting a face shear crystal by side edge engagement thereof, the positioning means for the crystal also serving as the electrode air gap spacing means.

A still further object of the invention is to provide an improved mounting structure for a face shear crystal unit of the air gap type wherein the crystal is retained in a substantially positive manner between its electrodes and wherein damping effects caused by relative motion between the adjacent surfaces of the crystal and its retaining means are minimized.

A still further object of the invention is to provide an improved structure for centering a crystal between its electrodes, said centering structure being such as to impose a minimum amount of damping on the crystal.

Further objects and advantages of the invention will become apparent from the following description and claims and from the accompanying drawings, wherein:

Figure 6:
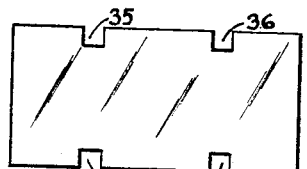
Figure 6 is a plan view of a notched face shear crystal plate according to the present invention, said plate having a second order vibrational component.
Figure 1:
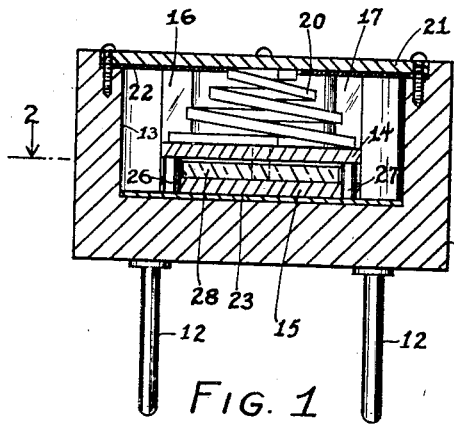
Figure 1 is a vertical cross-sectional view of a crystal holder embodying a method and means for retaining the crystal in accordance with the present invention.

Referring to the drawings, 11 designates a crystal holder, said holder being of any suitable shape. For purposes of illustration, holder 11 is shown in the drawings as being generally cylindrical, and is provided with a pair of contact prongs 12, for connection to an external circuit. Holder 11 is formed with an internal generally cylindrical cavity 13 which is formed with four vertical right-angled corner grooves 16, 17, 18 and 19 adapted to slidably receive the four respective corners of a pair of rectangular electrodes 14 and 15 when said electrodes are placed in parallel operative relationship in the bottom of cavity 13. A helical coil spring 20 bears on the top electrode 14, said spring being compressed by the top cover 21 of the holder, said cover being secured in a circular seat provided therefor in the top rim of said holder, a sealing gasket 22 being interposed between cover 21 and its seat.

Bottom electrode 15 bears on a contact plate 23 which is electrically connected to one of the prongs 12, the upper electrode 14 being connected by means not shown to the other of the prongs.

Top electrode 14 is perforated along a longitudinal median line thereof adjacent its forward and rear edges, and frictionally secured in the respective perforations are the respective depending spacer pins 24 and 25 of insulating material, such as plastic, which bear on lower electrode 15 and support upper electrode 14 in parallel spaced relation to said lower electrode. Lower electrode 15 is perforated along a transverse median line adjacent its left and right side edges, and frictionally secured in the respective perforations are upstanding spacer pins 26 and 27 which support the side portions of upper electrode 14. The spacer pins thus define a predetermined fixed space between the parallel electrodes 14 and 15.

Positioned between the electrodes is a crystal plate 28, said plate being formed with notches 29 and 30 at the median portions of its respective side edges, said notches loosely engaging the respective spacer pins 26 and 27 carried by the lower electrode 15. Sufficient clearance is provided in the notches so that the crystal plate may oscillate freely in the space between electrodes 14 and 15 without being frictionally damped to any appreciable degree by contact with the spacer pins. A predetermined air gap is provided between the top surface of crystal plate 28 and upper electrode 14.

Although crystal plate 28 is preferably of the face shear type, crystal plates having any one of the other well known modes of oscillation may be employed, provided that the notches 29 and 30 are properly dimensioned to allow sufficient looseness of contact with the spacer pins to prevent excessive damping of the crystal oscillations.

Figure 4:
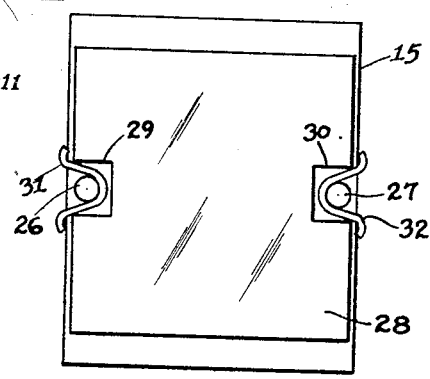
Figure 4 is a detail plan view illustrating a modification of the crystal retaining structure of the present invention.
Figure 2:
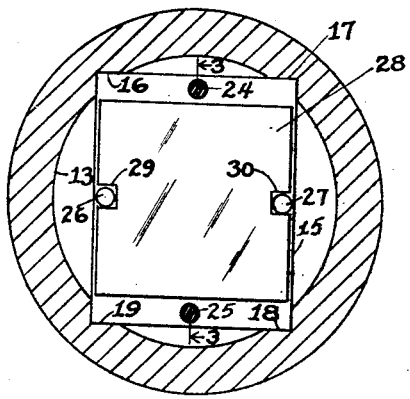
Figure 2 is a horizontal cross-sectional view taken on line 2—2 of Figure 1.

Referring to Figure 4, light U-shaped leaf springs 31 and 32 may be interposed between the respective spacer pins 26 and 27 and the outer corners of the respective notches 29 and 30. The leaf springs 31 and 32 provide a certain amount of cushioning of the crystal plate with respect to the retaining pins and may be designed so as to be sufficiently flexible to avoid introducing excessive damping of crystal oscillations. In the case of face shear vibrations, the corners of the notches move in the plane of the crystal 28 and the motion of said corners is relatively slight, whereby damping caused by the flexing of the leaf springs will be practically negligible.

Figure 5:
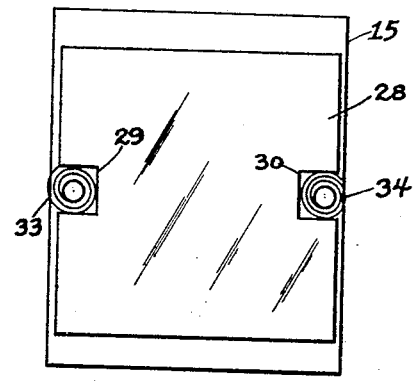
Figure 5 is a detail plan view similar to Figure 4 illustrating a still further modification of the crystal retaining structure of the present invention.
Figure 3:
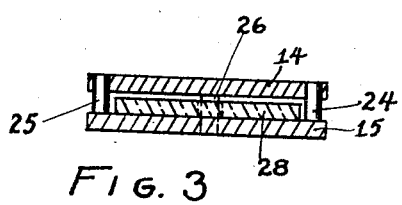
Figure 3 is a detail cross-sectional view taken on line 3—3 of Figure 2.

Instead of using leaf springs, light spiral cushioning springs 33 and 34 may be employed between the pins and their respective notches 29 and 30, as shown in Figure 5.

Figure 7:
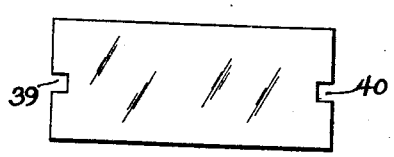
Figure 7 is a plan view illustrating an alternative method of notching a face shear crystal plate in accordance with the present invention.

In the above description, face shear modes of oscillation having first order vibrational components only have been considered, for example, those employed in crystal plates of the $CT_{11}$ or $DT_{11}$ type. Where the face shear mode of oscillation employed as the main crystal mode has a higher order vibrational component, such as a second order vibrational component, as in the $CT_{12}$ or $DT_{12}$ type, the edge regions of minimum movement in general will occur at locations spaced from the midpoints of the edges. In such a crystal plate, shown for example in Figure 6, the longer edges are notched at 35, 36, 37 and 38, corresponding to edge regions of minimum movement of the crystal for the desired mode of vibration along the longer edges, or at 39 and 40, the midpoints of the shorter edges, as shown in Figure 7, corresponding to regions of minimum movement along the shorter edges.

In general, the location of the positioning notches formed in the edges of a face shear crystal plate will depend upon the type of face shear oscillation employed, and, since the vibration pattern for each type of face shear oscillation may be readily determined, the edge regions of minimum movement can be located and notches may be provided at such regions through which stationary positioning elements may be passed for positioning the crystal plate with respect to its associated holder components.

While certain specific embodiments of a method and means for mounting a vibratory crystal have been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. A piezo-electric crystal unit comprising a pair of electrodes, a piezo crystal positioned between said electrodes, said crystal having indentations in its edges, and means carried by said electrodes loosely engaging said indentations.

2. A piezo-electric crystal unit comprising a pair of electrodes, a piezo crystal positioned between said electrodes, said crystal having a pair of opposing notches formed in the edge portion thereof, and means carried by at least one of the electrodes yieldingly engaging said notches.

3. A piezo-electric crystal unit comprising a pair of electrodes, a substantially rectangular piezo crystal positioned between said electrodes, said crystal having a notch formed at the median portion of each side edge thereof, and means carried by at least one of the electrodes yieldingly engaging said notches.

4. A piezo-electric crystal unit comprising a pair of electrodes, a piezo crystal positioned between said electrodes, a plurality of opposing notches formed in the edge portion of the crystal, and means carried by at least one electrode defining an air gap for said crystal, said means yieldingly engaging said notches to restrain substantial bodily movement of the crystal in its own plane.

5. A piezo-electric crystal unit comprising a pair of electrodes, a substantially rectangular piezo crystal positioned between said electrodes, a notch formed in the median portion of each of a pair of opposed side edges of the crystal, and means carried by the electrodes defining an air gap for said crystal, said means loosely engaging the notches to restrain the crystal against substantial bodily movement in its own plane.

6. A piezo-electric crystal unit comprising a pair of electrodes, a substantially rectangular piezo crystal positioned between said electrodes, a notch formed in the median portion of each of a pair of opposed side edges of the crystal, and means carried by at least one of the electrodes defining an air gap for said crystal, said means resiliently engaging the notches to restrain the crystal against substantial bodily movement in its own plane.

7. A piezo-electric crystal unit comprising a pair of electrodes, a piezo crystal positioned between said electrodes, a pair of opposed notches formed in the edge portion of the crystal, and a pair of non-conducting projections carried by one of said electrodes adapted to abut the other electrode to define an air gap for the crystal, each projection loosely engaging one of the notches to restrain the crystal against substantial bodily movement in its own plane.

8. A piezo-electric crystal unit comprising a pair of electrodes, a piezo crystal positioned between said electrodes, a pair of opposed notches formed in the edge portion of the crystal, a pair of non-conducting projections carried by one of said electrodes adapted to abut the other electrode to define an air gap for the crystal, each projection passing through one of the notches, and a spring interposed between each projection and the adjacent notch of the crystal.

9. The structure of claim 8, and wherein the spring is a leaf spring.

10. The structure of claim 8, and wherein the spring is a spiral spring.

HENRY M. BACH.

REFERENCES CITED

The following references are of record in the file of this patent:

UNITED STATES PATENTS

| Number | Name | Date |
| --- | --- | --- |
| 1,763,288 | Worrall | June 10, 1930 |
| 2,051,624 | Tripp | Aug. 18, 1936 |
| 2,123,236 | Fair | July 12, 1938 |
| 2,133,647 | Pierce | Oct. 18, 1938 |
| 2,167,506 | Haase | July 25, 1939 |